United States Patent [19]

Ruff

[11] Patent Number: 5,063,040

[45] Date of Patent: Nov. 5, 1991

[54] METHOD FOR INCREASING THE YIELD OF TRICHLOROSILANE IN THE FLUIDIZED-BED HYDROCHLORINATION OF SILICON

[75] Inventor: Klaus Ruff, Troisdorf, Fed. Rep. of Germany

[73] Assignee: Huels Aktiengesellschaft, Marl, Fed. Rep. of Germany

[21] Appl. No.: 467,286

[22] Filed: Jan. 23, 1990

Related U.S. Application Data

[63] Continuation of Ser. No. 325,545, Mar. 20, 1989, abandoned.

[30] Foreign Application Priority Data

Mar. 23, 1988 [DE] Fed. Rep. of Germany ....... 3809784

[51] Int. Cl.$^5$ ............................................ C01B 33/107
[52] U.S. Cl. ............................. 423/342; 423/DIG. 6
[58] Field of Search ................. 423/342, DIG. 6, 341

[56] References Cited

U.S. PATENT DOCUMENTS

| 4,117,094 | 9/1978 | Blocher et al. | 423/342 |
| 4,165,363 | 8/1979 | Weigert et al. | 423/342 |
| 4,217,334 | 8/1980 | Weigert et al. | 423/342 |

OTHER PUBLICATIONS

Teichmann et al., Z. Anorg. Allg. Chem. 347.145.

*Primary Examiner*—Olik Chaudhuri
*Assistant Examiner*—Kenneth Horton
*Attorney, Agent, or Firm*—Felfe & Lynch

[57] ABSTRACT

A method for increasing the trichlorosilane yield in the hydrochlorination of silicon in a fluidized bed involves chilling the gas mixture issuing from the fluidized bed in the shortest possible time immediately after leaving the fluidized bed to temperatures below 550° C. When the temperature of the fluidized bed is below 550° C., the gas mixture is chilled to temperature 100° C. lower than the reaction temperature in the fluidized bed. The method makes it possible, at a reaction temperature of, for example, 800° C. to increase the 16 to 20% trichlorosilane yields obtained formerly at this temperature to 55%, especially when gaseous silicon tetrachloride is also added to the fluidized bed.

5 Claims, No Drawings

METHOD FOR INCREASING THE YIELD OF TRICHLOROSILANE IN THE FLUIDIZED-BED HYDROCHLORINATION OF SILICON

This application is a continuation of application Ser. No. 325,545, filed March. 20, 1989, now abandoned.

FIELD OF THE INVENTION

This invention relates to a method for increasing the yield of trichlorosilane in the fluidized-bed hydrochlorination of silicon at a given reaction temperature. The method makes it possible to achieve increases of up to 45 percentage points in the yield of trichlorosilane at a controlled temperature in the range between 300° and 1200° C.

BACKGROUND OF THE INVENTION

It is known that trichlorosilane and silicon tetrachloride form in varying proportions in the hydrochlorination of silicon, depending upon the conditions under which the reaction is performed. An important factor which determines the proportion is the reaction temperature: low reaction temperatures promote the formation of trichlorosilane, while at increasing reaction temperatures the percentage of silicon tetrachloride increases, so that, at temperatures above 600° C., the latter is generally present in amounts of more than 80% in the resulting chlorosilane mixture.

It is economically desirable to operate at the highest possible reaction temperatures, because the reaction proceeds more rapidly and better yields are obtained per unit of time and capacity. Thus it has been observed that in the hydrochlorination of silicon, that is, in the reaction of hydrogen chloride with silicon, in the fluidized bed raising the reaction temperature from 300° to 500° C. results in an increase in the rate of reaction by a factor of 7. When the reaction temperature is raised from 300 to 700° C. the increase amounts to a factor of 22.

For the production of trichlorosilane as the main product, the fluidized bed process at temperatures of 300° to 400° C. is today generally used. In this method a good thermal transfer to the cooled reactor wall is assured, and thus local hot spots in the reaction bed, which lead to a poorer selectivity with respect to trichlorosilane, are avoided. If, however, silicon tetrachloride, is desired as the main product, the reaction takes place in a fixed bed reactor at temperatures of about 1000° C. and higher. Because of the poor thermal transfer in this method, a uniform temperature cannot be maintained in the reactor bed.

A disadvantage of all of the prior art methods is the fact that larger amounts of trichlorosilane are obtained only at relatively low reaction temperatures, at which a slow rate of reaction, and hence a less favorable yield per unit of time and capacity must be reckoned with. Furthermore, prior art methods are not flexible as regards the composition of the chlorosilane mixture, if the reaction temperature is not varied over wide ranges. Varying the reaction temperature over wide ranges to increase flexibility with regard to the trichlorosilane content in the chlorosilane mixture, however, is technically complex and uneconomical in the known methods. In the case of a possible combined production of trichlorosilane and silicon tetrachloride, it becomes very important economically to adapt to a fluctuating demand for the individual components contained in the chlorosilane mixture.

DE-AS 19 42 280 discloses a method for the preparation of chlorosilane by reacting silicon with hydrogen chloride in which this reaction is performed in the presence of hydrogen, and thus the content of trichlorosilane in the chlorosilane mixture can be increased. However, molar ratios of hydrogen chloride to hydrogen of 1:1 to 1:50 are needed in order to achieve the desired effect, and, with increasing reaction temperatures, larger amounts of hydrogen have to be used. The process therefore has the disadvantage that large volumes of reactants have to be handled, and that the separation of the chlorosilanes from the hydrogen requires a great deal of energy.

OBJECTS OF THE INVENTION

It is an object of the present invention to provide a method for the production of chlorosilanes in which the trichlorosilane content in the reaction mixture at a given temperature is increased even at higher reaction temperatures.

Other objects and advantages of the invention will become apparent as the description thereof proceeds.

DESCRIPTION OF THE INVENTION

I have discovered that the above object is achieved by a method for increasing the trichlorosilane yield in the fluidized bed hydrochlorination of silicon at a given fluidized bed reaction temperature in the range between 300° and 1200° C., which is characterized in that the reaction gases are cooled in less than 1 second, immediately after leaving the fluidized bed, to temperatures which a) are either no higher than 550° C., if the reaction temperature in the fluidized bed is above 550° C., or b) are at least 100° C. lower than the reaction temperature in the fluidized bed, if the latter is 550° C. or less.

It is essential, in accordance with the invention, that the quenching take place immediately after the reaction gases leave the fluidized bed, and that the chlorosilane mixture leaving the fluidized bed remain exposed as briefly as possible to the temperatures prevailing in the fluidized bed. This period of time should be no more than 1 second; the shorter it is, the higher the trichlorosilane content is in the chlorosilane mixture which is obtained. The method is therefore easily practiced at high velocities of the gas stream used for the production and sustaining of the fluidized bed, where the empty-tube velocities may be as high as 10 m/s. Such high empty-tube velocities can be achieved, for example, in a circulating fluidized bed.

Any conventional methods can be used for the quench, such as cooling the reaction gases on cold walls, cooling them in a cyclone directly adjoining the fluidized bed, or mixing cold gases with them. Preferably, the cooling of the reaction gases is performed by spraying liquid silicon tetrachloride onto the surface of the fluidized bed. This silicon tetrachloride can be obtained by condensation of the reaction gases, followed by separation into a fraction containing mainly silicon tetrachloride.

DE-PS 21 61 641 also discloses a method for the preparation of chlorosilanes by reacting ferrosilicon with hydrogen chloride, in which the reaction gas is chilled below the sublimation temperature of iron chloride in the head space of the reactor by spraying liquid chlorosilane into it. The process, however, is performed in the fixed bed. This procedure does not lead to any appreciable increase in the trichlorosilane content, as it appears from the example in this patent, in which the chlorosilane mixture produced has a composition of 83% $SiCl_4$, 16.8% $SiHCl_3$ and 0.2% $SiH_2Cl_2$, because another 0.9 kg of gaseous chlorosilane mixture per kilogram of hydrogen chloride is added to prevent sintering. As shown in Example 5 below, such addition without quenching produces a slight increase in the trichlorosilane content. An extrapolation of Example 5 to temperatures of 1300° C. shows that, when the quenching is performed the trichlorosilane content must be more than 30%. In the procedure described in DE-PS 21 61 641, this result was not obtained, because the method in accordance with the present invention cannot be performed in a fixed bed.

A preferred embodiment of the novel method comprises adding gaseous silicon tetrachloride to the fluidized bed in addition to the hydrogen chloride, thereby still further increasing the trichlorosilane yield. The greater the amount added, the greater the trichlorosilane content in the chlorosilane mixture obtained by the reaction. The addition of 30 to 50% by volume is easily possible. The amount that can be added will be limited by economic considerations.

The method according to the present invention can be used in all known fluidized bed processes for the production of chlorosilanes by hydrochlorination of silicon. The term "silicon" should be understood, within the context of the present invention, to refer not only to metallic silicon, but also to alloys or intermetallic compounds of silicon with, for example, iron, carbon, phosphorus or nitrogen, in which the silicon content is more than 50%, as in ferrosilicon, for example. The grain size of the silicon can be between 10 and 1000 μm, preferably between 30 and 800 μm. The average grain size is 150 to 300 μm.

The trichlorosilane produced by the method of the instant invention is an important starting product for the preparation of organosilicon compounds, water-repellent compositions, and highpurity silicon for solar cells and semiconductors. The silicon tetrachloride which is also produced serves mainly as a starting material for the production of highly dispersed silicic acid.

The following examples illustrate the present invention and will enable others skilled in the art to understand it more completely. It should be understood, however, that the invention is not limited solely to the particular examples given below.

EXAMPLE 1

A fluidized bed reactor was filled with metallic silicon dust having a silicon content of 98 percent by weight and a particle size between 0.05 and 0.5 mm. At a reaction temperature of 800° C. and an absolute pressure of 1.5 bar, anhydrous hydrogen chloride was fed in at the bottom as the fluidizing gas and as the reagent through a bottom spreader, so that an empty tube velocity of 20 cm/s established itself in the reactor. The conversion of the hydrogen chloride was complete.

Liquid $SiCl_4$ at 20° C. was sprayed downward through a feed tube with a spreader nozzle onto the fluidized bed, thereby cooling the reaction gases from 800° C. to 400° C. in less than 1 second. In the chlorosilane mixture resulting from the reaction a trichlorosilane content of 28 percent by weight was found.

COMPARATIVE EXAMPLE

The reaction was performed under the same conditions as in Example 1 except that the reaction gases were not cooled directly over the fluidized bed. The reaction mixture had a trichlorosilane content of 16 percent by weight.

EXAMPLE 2

The reaction was performed under the same conditions as in Example 1. In addition, silicon tetrachloride vapor was admixed with the hydrogen chloride at the rate of 0.7 kg per kg hydrogen chloride before it entered into the reactor. After the quench to 400° C. the resulting chlorosilane mixture formed by the reaction had a trichlorosilane content of 40 percent by weight. Upon the admixture of 1.4 kg of silicon tetrachloride per kg of hydrogen chloride, the chlorosilane mixture formed by the reaction had a trichlorosilane content of 55% after quenching to 400° C.

COMPARATIVE EXAMPLE

The procedure of Example 2 was repeated, with the admixture of 0.7 kg of silicon tetrachloride vapor per kilogram of hydrogen chloride. The reaction gases were not quenched. The trichlorosilane content in the chlorosilane mixture formed by the reaction amounted to 20 percent by weight.

EXAMPLE 3

A fluidized bed reactor was filled with metallic silicon dust having a silicon content of 98% and a particle size between 0.063 and 0.7 mm. At an absolute pressure of 1.5 bar and a reaction temperature of 500° C., vaporous silicon tetrachloride in an amount of 15% of the volume of the hydrogen chloride was introduced together with the hydrogen chloride into the fluidized bed from below through a bottom spreader, so that an empty-tube velocity of 15 cm/s was established. At the level of the surface of the fluidized bed, nitrogen at 20° C. was blown in through radially arranged tubes in an amount such that the reaction gases emerging from the fluidized bed were cooled within 0.5 second to 300° C. In the chlorosilane mixture formed by the reaction a trichlorosilane content of 84 percent by weight was found. Without quenching, under otherwise equal conditions, 55 percent by weight of trichlorosilane was obtained.

When, under otherwise equal conditions, the reaction temperature was changed, to 430° C., 99 percent, by weight of trichlorosilane was obtained with quenching in the mixture resulting from the reaction, but without quenching 75 percent by weight of trichlorosilane was obtained.

EXAMPLE 4

The procedure of Example 1 was repeated, except that the empty tube velocity was 40 cm/s and the reaction temperature was 1000° C. In the chlorosilane mixture produced by the reaction, after quenching to 500° C. within 0.2 seconds, a trichlorosilane content of 24 percent by weight was obtained. Without quenching the trichlorosilane content was 14 percent by weight.

EXAMPLE 5

The procedure of Example 4 was repeated with the following changes:

0.7 kg of SiCl$_4$ was admixed per kg of hydrogen chloride. After quenching within 0.1 second to 500° C., 36 percent by weight of trichlorosilane was obtained in the chlorosilane mixture produced by the reaction. Without quenching, the chlorosilane mixture contained only 18 percent by weight of trichlorosilane.

EXAMPLE 6

In a reactor with a directly adjoining cyclone a fluidized bed was produced under the following conditions with a metallic silicon dust corresponding to Example 1, at standard pressure:

The empty-tube velocity of the hydrogen chloride was 1.4 m/s, and the temperature was 650° C. The fluidized bed extended over the entire length of the reactor of 4 meters. The reaction gases were cooled within 0.3 seconds by keeping the cyclone at room temperature. In its interior the temperature was about 500° C.

The chlorosilane mixture leaving the cyclone contained 60 percent by weight of trichlorosilane.

When the gases were not cooled in the cyclone, the trichlorosilane content of the chlorosilane mixture obtained was only 19 percent by weight.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:

1. The method of increasing the content of trichlorosilane in the mixture of chlorosilanes produced by the hydrochlorination of silicone in a fluidized-bed reactor at a temperature between 300° and 1000° C., which comprises fluidized silicon dust in said reactor with gaseous hydrogen chloride, cooling the mixture of hot reaction gases formed thereby within less than one second after leaving the fluidized bed to a temperature which
   a) is either no higher than 550° C. if the reaction temperature in the fluidized bed is above 550° C., or
   b) is at least 100° C. lower than the reaction temperature in the fluidized bed, if the latter is 550° C. or less, and recovering the mixture of chlorosilanes.

2. The method of claim 1, wherein the mixture of hot reaction gases is cooled with silicon tetrachloride.

3. The method of claim 2, wherein the reaction gases are cooled by spraying liquid silicon tetrachloride into the fluidized bed.

4. The method of claim 1, wherein the silicon dust is fluidized with a mixture of gaseous hydrogen chloride and gaseous silicon tetrachloride.

5. The method of claim 1, wherein the silicon dust is fluidized with a mixture of gaseous silicon tetrachloride and gaseous hydrogen chloride, and the hot reaction gases are cooled by spraying silicon tetrachloride into the fluidized bed.

* * * * *